June 30, 1925.
J. R. GAMMETER
DOORCHECK STRAP
Filed Jan. 15, 1923
1,543,912
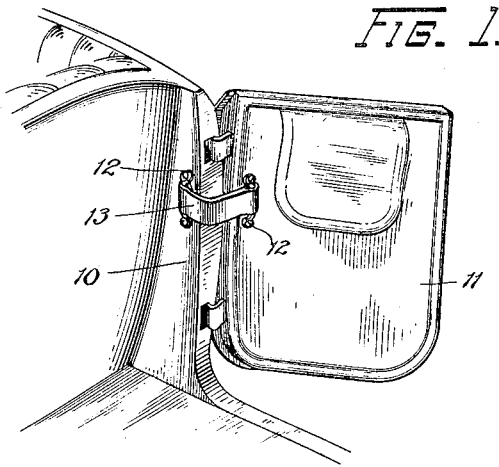
FIG. 1.
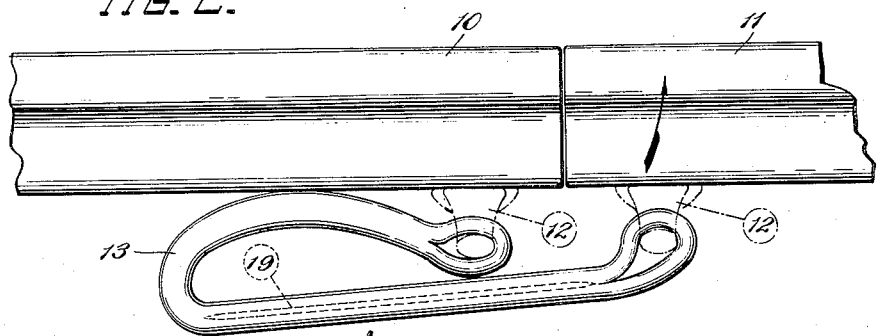
FIG. 2.
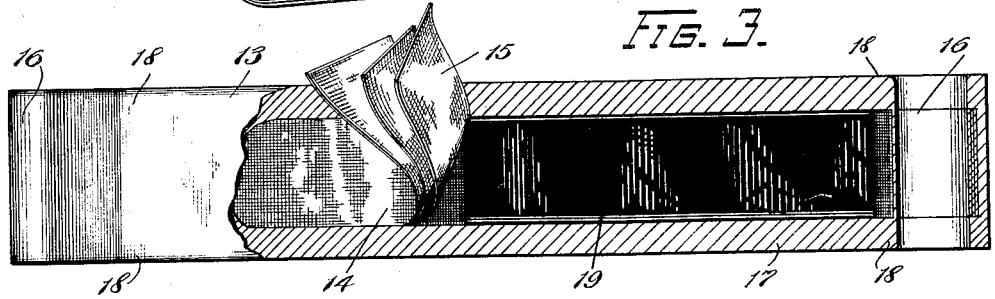
FIG. 3.
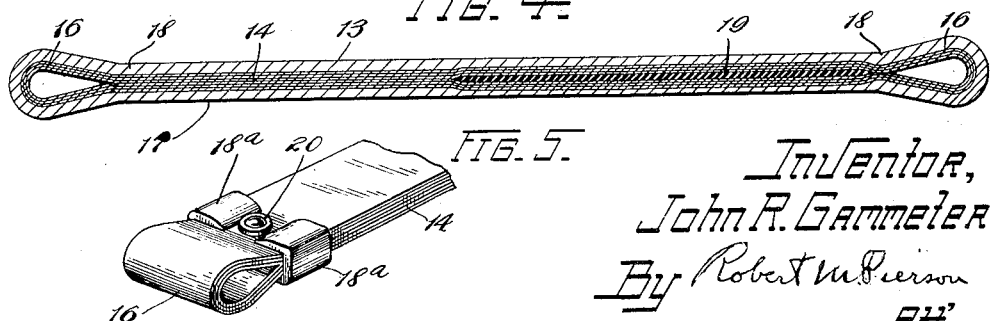
FIG. 4.
FIG. 5.
Inventor,
John R. Gammeter.
By Robert M. Pierson
Atty.

Patented June 30, 1925.

1,543,912

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

DOORCHECK STRAP.

Application filed January 15, 1923. Serial No. 612,820.

*To all whom it may concern:*

Be it known that I, JOHN R. GAMMETER, a citizen of the United States, residing at Akron, in the county of Summit and State of Ohio, have invented a certain new and useful Doorcheck Strap, of which the following is a specification.

This invention relates to straps, and especially check-straps for limiting the opening movement of doors, such as automobile doors. Its principal object is to provide an article of this class which shall combine, to an increased extent, the qualities of strength, cheapness of manufacture, durability and susceptibility of ornamentation and finish. An additional purpose is to provide such a construction as will cause the strap automatically to fold into a compact shape when the door is closed.

Of the accompanying drawings, Fig. 1 is a perspective view of a portion of a vehicle body showing the application of the strap, the door being open.

Fig. 2 is a plan view showing a preferred form of my improved strap with the door closed.

Fig. 3 is a plan view of the strap, partly broken away and in section.

Fig. 4 is a longitudinal section of the strap.

Fig. 5 is a perspective view showing one end of a modified form of strap.

Referring at first to Figs. 1 to 4, 10 is the door-frame and 11 the door of a vehicle, and 12, 12 are the usual metal anchorage members or fasteners, one on the door and one on the jamb, each comprising a bar passed through an end loop of the strap and having feet secured by screws to the supporting surface.

13 is the check-strap having an internal, laminated thread or cord foundation 14 composed of a strip of fabric, preferably a straight-laid, selvage, woven tape 15, although it might be weftless cord or weak-wefted thread fabric such as is used in pneumatic tire carcasses, or other suitable aggregation of threads or cords, whether straight-laid or not, all of which I include broadly under the term "fabric". The tape 15 is wound upon itself in several plies to form an endless band whose sides are brought together and vulcanized in contact throughout the intermediate portion or body of the belt, but left open or apart to form a pair of loops or eyes 16, 16 at the respective ends of the strap for the reception of the anchoring members 12, the latter being assembled with the strap by passing them through the loops. The rubberizing of the tape 15 may be accomplished by coating it with cement, or by frictioning, or both.

17 is a relatively-thick covering of soft rubber enclosing the fabric foundation 14 throughout its length and vulcanized thereto. This covering forms a protective reinforcing, flat, tubular sheath for the fabric, laterally pierced or open at the loops 16, and preferably of considerably greater width than the fabric as shown in Fig. 3, so that the strap has wide margins of soft rubber extending laterally beyond the fabric foundation on both edges. The rubber covering not only provides a flexible and durable protection capable of being molded with an attractive finish, either plain or ornamental, but it also serves as an external binder around the edges of the fabric foundation, acting to prevent the separation of the plies, or the separation of the two sides of the fabric belt from each other. This function is especially important at the four points 18, 18 adjacent the crotches of the loops 16 on both edges of the strap, where the tugging strains tend to start such separation between the sides of the fabric belt. It is observed that even if a separation does start between the fabric members, the wide, elastic rubber binders at the points 18 prevent it from spreading to the edges of the strap and longitudinally toward the middle thereof. Such structure further provides a desirable elasticity across the thickness of the belt at the crotches to absorb the tugging strains. The rest of the marginal rubber encasement serves like functions in a lesser degree for the intermediate portions of the fabric foundation. With this construction it is found that an efficient check-strap can be made merely of fabric and rubber without stitching, riveting or other supplementary connection between the sides of the foundation, although I do not exclude the use of such auxiliaries.

For approximately one-half of the length of the strap, beginning near one of the loops 16, I provide, in the preferred form of my invention, a stiffener consisting in this instance of a layer 19 of semi-hard rubber interposed between and vulcanized to the two innermost plies of the fabric foundation 14 and having substantially the same width as the latter, the remainder of the strap being without this stiffening, so that its other half is more flexible. This causes the strap to fold compactly against the inner side of the vehicle wall when the door 11 is closed substantially as indicated in Fig. 2, rather than to form a loop projecting at right-angles to said wall. It will be understood, however, that the invention is not wholly limited to the inclusion of this feature. Nor is it, though including an endless, vulcanized, rubber and fabric belt molded with substantially parallel sides and end loops, necessarily limited to the uniting of said sides by vulcanization or otherwise.

In Fig. 5 is shown a modification omitting practically all of the sheath except a pair of U-shaped binding members 18ª of elastic rubber, vulcanized to the fabric foundation 14 at the crotch of the loop 16 and embracing the margins of said foundation. Between these members is located a rivet 20 securing the sides of the fabric belt together to supplement the binding action of the members 18ª and of the vulcanized rubber facing (or coating) on the plies, in case such a facing is used. Where rubber frictioned or coated fabric is used in this modification there will, of course, be a thin skin of vulcanized rubber on the outer surfaces of the strap, and there might be additional heavy rubber applied, as will be obvious, without covering the whole of the fabric foundation with heavy rubber as in my first-described embodiment.

Other modifications can be made without departing from the scope of my invention.

I claim:

1. A door-check strap comprising a relatively-thin and wide, rubberized, fabric, foundation belt having its sides vulcanized together and looped at the end of the strap to form an eye for receiving an anchoring member, the body of the strap in at least a portion of its length being highly flexible to permit bending.

2. A door-check strap comprising an endless, relatively-thin and wide, rubberized, fabric, foundation belt having its sides vulcanized together in the body of the strap and looped at the two ends to form eyes for the reception of anchoring members, the body of the strap in at least a portion of its length being highly flexible to permit bending.

3. A door-check strap comprising an endless, bendable foundation belt having its sides vulcanized together in the body of the strap and looped at the two ends to form eyes, said belt consisting of a rubberized, woven, fabric tape wound upon itself in a plurality of convolutions.

4. A door-check strap comprising a fabric foundation belt having its sides brought together in the body of the strap and looped at the end to form a fastener-receiving eye, and an elastic, rubber binding structure vulcanized to both sides of said belt on the margin thereof at the crotch of the eye, said strap being relatively thin and wide, and highly flexible in at least a portion of its length.

5. A door-check strap comprising an endless, bendable foundation belt composed of rubberized strip fabric wound upon itself in a plurality of convolutions, said belt having its sides vulcanized together in the body of the strap and looped at the two ends to form eyes for the reception of anchoring members, together with an elastic rubber binding structure of substantial thickness compared to the thickness of the belt, vulcanized to said belt and embracing both margins thereof at the crotches of said loops.

6. A door-check strap comprising an endless, rubberized, fabric foundation belt having its sides vulcanized together in the body of the strap and looped at the ends to form eyes, and an elastic rubber cover substantially enclosing and vulcanized to said belt and being of substantial thickness compared with the belt and wider than the belt on both margins at the crotches of said loops, the strap as a whole being relatively thin compared with its width and highly flexible in at least a portion of its length to permit bending.

7. A strap comprising an endless foundation belt composed of a straight-laid, woven, selvage, rubberized tape wound upon itself in a plurality of plies, the sides of said belt being vulcanized together in the body of the strap and looped to form eyes at the two ends, the belt being covered with a substantial thickness of elastic, vulcanized rubber embracing its margins and extending laterally for a substantial distance beyond said margins to form flexible edge-binders therefor and to act as a wearing cover for the belt.

8. A door-check strap comprising an endless, rubberized, fabric, foundation belt having its sides vulcanized together in the body of the strap and upon an interposed, relatively-hard, rubber stiffening layer extending for substantially one-half only of the length of said body from a point adjacent one of the end loops, said belt being looped at the ends of the strap to form eyes.

9. A door-check strap comprising an endless, rubberized, laminated, fabric, foundation belt having its sides vulcanized together in the body of the strap and looped at the ends to form eyes, an internal stiffening layer of relatively-hard rubber vulcanized between the sides and extending from adjacent one of the loops to a terminus adjacent the middle of said body, and a cover of soft rubber vulcanized upon said body, extending laterally beyond both margins of the belt and embracing said margins to bind the sides together at and between the crotches of the loops.

In witness whereof I have hereunto set my hand this 13 day of January, 1923.

JOHN R. GAMMETER.